Sept. 23, 1958     V. K. KOFRON ET AL     2,853,663
POWER TRANSMISSION
Filed July 8, 1954
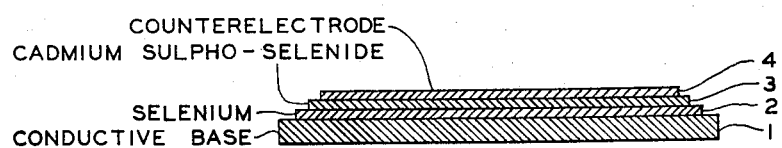
INVENTORS
VERNON K. KOFRON
MONROE D. LEVY
BY
ATTORNEY

2,853,663
POWER TRANSMISSION

Vernon K. Kofron, St. Louis, and Monroe D. Levy, University City, Mo., assignors to Vickers, Incorporated, Detroit, Mich., a corporation of Michigan Application July 8, 1954, Serial No. 442,128

7 Claims. (Cl. 317—241)

This invention relates to power transmission and more particularly to blocking layer devices such as selenium rectifier cells and selenium light-sensitive cells, and to methods of making such devices.

Selenium cells for use as rectifiers or photocells usually comprise a thin layer of crystalline selenium on a suitable base or carrier plate of nickel-coated aluminum or any conducting material which will not react unfavorably with selenium and, a metal counterelectrode overlying the selenium surface. In common method of manufacturing selenium cells, an adherent layer of amorphous selenium is first applied to the base plate by melting selenium thereon, or condensing selenium vapor thereon, or by subjecting a layer of powered selenium on the plate to heat and pressure. The coated plate is then given a suitable annealing or heat treatment to change the selenium layer from its amorphous state to the crystalline form. During the usual heat treatment, the plate is subjected to a temperature slightly below the melting point of selenium, for example at a temperature within the range of 200° C. to just under the melting point, for a time sufficient to develop the crystal formation of the selenium. The annealing of selenium for this purpose has a time and temperature relation well known in the art. The exposed surface of the selenium layer is usually treated or coated to form an "artificial barrier" before the application of the counterelectrode, the latter being, for example, a low melting point metal, such as the alloy of 30% tin (by weight) and 70% cadmium applied to the selenium surface by any suitable method such as spraying. In the case of light-sensitive cells the counterelectrode is usually a thin light permeable film of metal such as gold, platinum, or other, on the selenium surface. After the counterelectrode is in place, the cell is electroformed to improve the rectification, for example by sending current through the cell in the inverse direction until the cell forms to the desired inverse resistance.

Some of the criteria of cell evaluation are the inverse characteristics, the forward characteristics, aging, and operation and life at high ambient temperatures. The forward direction of a cell is the direction of lesser resistance to current flow through the cell and the reverse or inverse direction of the cell is the direction of greater resistance to current flow. Inverse and forward voltage ratings are related to reverse and forward currents respectively.

Aging is any persisting change, except failure, which takes place for any reason in either the forward or reverse resistance characteristic when the rectifier is in use.

As one indicia of reverse resistance and cell performance, it is customary in the metallic rectifier industry to refer to the alternating current R. M. S. voltage rating of the cell. This rating is based on the maximum inverse voltage at which the reverse current will not exceed a safe value. At a safe inverse current value abnormal aging and complete breakdown may be avoided. If a cell is operated at a higher voltage than its normal inverse voltage rating shorter life is to be expected.

It is customary in the industry and advised by NEMA to derate rectifiers at ambient temperatures above 35° C. to preserve the same life expectancy which would obtain at an ambient temperature of 35° C. Either the input voltage or the output current, or a combination of both, are derated. It is typical to derate in current above 35° C. and in voltage above 50° C.

The application of what may be termed "barrier agents" on the selenium surface before the application of the counterelectrode is well known in the art, and numerous such agents have been employed resulting in many different effects on the characteristics of the final cell.

Among the virtues sought for in a rectifier cell are high inverse resistance, low forward resistance, and freedom from aging at a rapid rate, not only at 35° C. ambient, but also at high ambient temperatures.

Some barrier layers provide cells with high inverse resistance and low forward resistance with the unhappy combination of short life or fast aging. Cells with other barrier layers have long life with a high inverse resistance but an undesirably high forward resistance. Still others are characterized by low forwards, long life, and low inverse resistance. Regardless of the method or materials used in selenium cell manufacture, the electrical characteristics of all the cells in a single batch are not the same. A desirable goal is a high percentage yield of high voltage cells.

We have found that a superior barrier is formed by the application of a cadmium sulpho-selenide to the surface of a selenium layer, and that cells made therewith are superior in many respects. For example, we have found that cells made in accordance with the invention herein have high inverse resistance, low forward resistance, and a favorably slow aging rate, not only at the customary standard ambient temperature of 35° C. but also, without increase in the aging rate, at ambient temperatures as high as 75° C.

It is an object of the present invention to provide new and improved selenium cells and a method for making them.

Another object of the invention is to provide a novel treatment of an exposed surface of a selenium layer for use in rectifier or light-sensitive devices.

Another object of the invention is to provide a novel barrier in a selenium cell and a method for producing the same.

Another object is to provide a selenium cell characterized by a high inverse R. M. S. voltage rating.

Another object is a selenium device characterized by a high inverse resistance and a low forward resistance.

Another object of the invention is to provide a selenium cell characterized by a high inverse resistance, a low forward resistance, and a slow rate of aging.

A further object is the provision of a selenium cell which can be operated at high ambient temperatures without requiring derating.

A further object is to reduce rate of aging in selenium cells.

Further objects and advantages of the present invention will be apparent from the following description, reference being had to the single figure drawing wherein a preferred embodiment of the invention is clearly shown in exaggerated detail.

Referring now to the drawing, a rectifier made in accordance with the present invention includes a base electrode 1, a layer of selenium 2, a layer of cadmium sulpho-selenide 3, and a counterelectrode 4.

The base 1 may be made of any of the many electrical conductors known in the art to be suitable for selenium cell construction, for example, nickel, steel, aluminum, nickeled steel, nickeled aluminum, or any metal or other conductor to which the selenium will adhere but which will not react unfavorably with the selenium. The selenium layer or coating 2 is provided on the plate 1 by any suitable method, for example, as follows: an adherent layer of partially crystallized selenium is first applied to the base by subjecting a layer of powdered amorphous selenium on the base to heat and pressure which softens, smoothes, and partially crystallizes the selenium. The selenium is then completely changed to the crystalline form by suitable annealing or heat treatment, for example the heat treatment hereinbefore described.

After the selenium has been changed to its crystalline form, the layer of cadmium sulpho-selenide 3 is applied on the exposed surface of the selenium, preferably by sublimation in a high vacuum. To sublime is to pass from the solid state to the gaseous state and again condense to solid form without apparently liquefying; i. e., to vaporize from solid form and condense back to solid form without passing through a liquid phase. This may be done in an evacuated enclosure containing the crystalline selenium coated base by placing cadmium sulpho-selenide powder or pellets in filaments or boats within the enclosure and heating the filaments thereby to heat and sublime the cadmium sulpho-selenide. The filaments may be heated indirectly, or directly by passing electric current therethrough. The residual atmosphere for the sublimation of cadmium sulpho-selenide may be air or an inert gas. Excellent results have been obtained with air as the residual atmosphere.

Although the sublimation may be effected at higher pressures, best results were obtained by subliming the cadmium sulpho-selenide on the selenium in the enclosure evacuated to a pressure below 11 microns of mercury. Excellent cells have been produced by sublimation of the cadmium sulpho-selenide at pressures ranging from about 0.1 to about 10 microns of mercury. While the temperature is not critical, the temperature to which the cadmium sulpho-selenide is heated should be such as to induce sublimation at a reasonably rapid rate at the pressure employed. Temperatures ranging from about 1000° C. to about 1200° C. were found to be suitable for this process with the low pressures disclosed herein.

The cells are benefited by any reasonable thickness of the cadmium sulpho-selenide layer. Excellent results have been attained with thicknesses of these barrier layers ranging from approximately .00001 cm. to .001 cm.

The remainder of the process for completing the cell is standard for the art, that is, the application of a suitable counterelectrode 4 and subsequent electroforming. Although other counterelectrodes are suitable, the alloy of tin (30%) and cadmium (70%) applied, as usual in the art, by spraying, provides a good counterelectrode, and gave excellent results in connection with the cadmium sulpho-selenide layer. After the application of the counterelectrode, the cell is electroformed by any suitable method, many such methods being well known in the art, for example, by flowing direct current through the cell in the reverse direction until the reverse resistance builds up to a suitable value.

Cadmium sulpho-selenides are as their name indicates, chemical compounds containing cadmium, sulphur, and selenium, in various molecular ratios, and may be prepared in a number of known ways.

In the practice of the invention, cadmium sulpho-selenides, which by chemical analysis contain cadmium, sulphur, and selenium, in proportions by weight falling approximately within the following ranges are preferred as barrier layers: cadmium 66%–73%, sulphur 10%–16%, and selenium 24%–11%. Particularly good cells were obtained employing the sublimation conditions described herein with cadmium sulpho-selenides having compositions falling approximately within the following limits: cadmium 68%–71%, sulphur 11%–15%, and selenium 21%–14%.

In a particular embodiment cells were made with the base plates 1 of nickeled aluminum; the crystalline selenium was formed on the plates by converting adherent amorphous selenium to the crystalline form employing the hereinbefore described heat treatment; cadmium sulpho-selenide, composed of 68.46% cadmium, 11.38% sulphur and 20.16% selenium, was vapor-deposited (sublimated) on the selenium at a pressure of less than 11 microns of mercury, the cadmium sulpho-selenide being vaporized at a temperature approximately in the range of 1000° C. to 1200° C.; counterelectrodes made of an alloy of 30% tin and 70% cadmium were sprayed on the cells; and the cells were electroformed by passing current therethrough in the reverse direction.

In another embodiment a group of cells was made in accordance with the preceding paragraph, except that the composition of the cadmium sulpho-selenide barrier agent employed was 70.44% cadmium, 14.2% sulphur, and 15.36% selenium.

Other embodiments were made with cadmium sulpho-selenides having different proportions of cadmium, sulphur, and selenium.

Use of cadmium sulpho-selenide it form a barrier layer as described herein has resulted in unusually high percentages of yields of cells having inverse rating ranging from 35 to 50 volts R. M. S. Production groups of cells with a cadmium sulpho-selenide barrier layer have been made yielding as high as 90% of cells in the range of 35 to 50 volts R. M. S. inverse. In addition the aging rate of these high voltage cells was favorably low, and the aging rate was approximately the same at 35° C. and at 75° C. ambient temperatures. Further, these cells, produced in accordance with the present invention, had a high reverse resistance while maintaining a favorably low forward resistance.

While the form of embodiment of the invention as herein disclosed constitutes a preferred form, it is to be understood that other forms might be adopted, all coming within the scope of the claims which follow.

What is claimed is as follows:

1. A blocking layer device comprising a selenium surface and a layer of cadmium sulpho-selenide on said surface.

2. A blocking layer device comprising a layer of selenium, a layer of essentially cadmium sulpho-selenide on said selenium layer, and a counterelectrode on said cadmium sulpho-selenide layer.

3. A blocking layer device comprising a conductive base, a layer of selenium on said base, a layer of essentially cadmium sulpho-selenide on said selenium layer, and a counterelectrode on said cadmium sulpho-selenide layer, said cadmium sulpho-selenide having the following approximate proportions: cadmium 68%–71%, sulphur 11%–15%, and selenium 21%–14%.

4. A blocking layer device comprising a selenium surface, an electrode on said surface, and a layer comprising cadmium sulpho-selenide between said surface and said electrode.

5. A blocking layer device comprising a selenium surface, an electrode on said surface, and a layer comprising cadmium sulpho-selenide between said surface and said electrode, said cadmium sulpho-selenide having the following approximate proportions: cadmium 66%–73%, sulphur 10%–16%, and selenium 24%–11%.

6. A blocking layer device comprising a selenium surface and a layer on said surface, said layer having been formed by exposing said surface to cadmium sulpho-selenide vapor.

7. An electrical device comprising a conductive base, a counterelectrode, selenium therebetween, and a barrier layer between the selenium and the counterelectrode, the barrier layer having been formed by the exposure of the selenium to cadmium sulpho-selenide.

References Cited in the file of this patent
UNITED STATES PATENTS

| | | |
|---|---|---|
| 2,479,446 | Wilson | Aug. 16, 1949 |
| 2,554,237 | Blackburn | May 22, 1951 |
| 2,613,301 | Dubar et al. | Oct. 7, 1952 |